United States Patent [19]

Tanuma et al.

[11] Patent Number: 4,748,387
[45] Date of Patent: May 31, 1988

[54] DC BRUSHLESS MOTOR DRIVING METHOD AND APPARATUS FOR ACCURATELY CONTROLLING STARTING POSITION OF ROTOR

[75] Inventors: Jiro Tanuma; Takao Uchida, both of Tokyo, Japan

[73] Assignee: Oki Electric Industry Co., Ltd., Tokyo, Japan

[21] Appl. No.: 75,034

[22] Filed: Jul. 17, 1987

[30] Foreign Application Priority Data

Jul. 25, 1986 [JP] Japan .................................. 61-173926

[51] Int. Cl.$^4$ ........................ H02K 29/14; H02P 9/00
[52] U.S. Cl. ........................................ 318/254; 318/138
[58] Field of Search ............... 318/138, 254, 264, 277, 318/430, 431, 439

[56] References Cited

U.S. PATENT DOCUMENTS 3,324,369  6/1967  Markakis ............................ 318/138
4,631,457 12/1986  Tanuma et al. ..................... 318/254

FOREIGN PATENT DOCUMENTS 57-40357  3/1982  Japan ................................. 318/254

*Primary Examiner*—Bentsu Ro
*Attorney, Agent, or Firm*—Wenderoth, Lind, and Ponack

[57] ABSTRACT

A driving apparatus for controlling the drive of a direct current (DC) brushless motor including a stator having a plurality of armature coils which are provided on a generally circular stator yoke, and a rotatable rotor in which a disk-like magnet having N and S poles arranged alternately in a circumferential direction is provided on a generally circular rotor yoke to face the armature coils, includes a speed sensor for producing outputs responsive to a rotation speed of the rotor, a counter for counting the pulses which are produced by the speed sensors, a control circuit responsive to the speed sensors and counter for controlling the current applied to the armature coils in a predetermined sequence to thereby rotate the rotor, and a mechanism for cancelling a load acting on the rotor. The control circuit, at a start-up of the motor, switches the current applied to the armature coils to excite the armature coils in several different phases to thereby locate the rotor at a starting angular position, in the event when the rotor is located at the starting angular position, cancels a load acting on the rotor, at least before a last one of the phases is excited, subsequently controls rotation drive by counting output pulses of the speed sensor to determine an angular position of the rotor, and controls a rotation direction of the rotor on the basis of output pulses of the speed sensor and on a resulting count of the pulses. Also provided is a driving method for a brushless DC motor for effecting such a control.

8 Claims, 10 Drawing Sheets

DC BRUSHLESS MOTOR DRIVING METHOD AND APPARATUS FOR ACCURATELY CONTROLLING STARTING POSITION OF ROTOR

BACKGROUND OF THE INVENTION

1. Field of the Invention

The present invention relates to a method of driving a direct current (DC) brushless motor and an apparatus for the same and, more particularly, to a method and an apparatus for driving a DC brushless motor (or brushless DC motor) while controlling the starting position of a rotor of the motor. The method and apparatus to which the present invention pertains are advantageously applicable to a printer and like machines.

2. Description of the Prior Art

A DC brushless motor known in the art includes a rotatable rotor having a disk-like magnet having N and S poles arranged alternately around a shaft of the rotor, and a stator provided with a plurality of armature coils which are arranged around a bearing of the stator, which supports the shaft of the rotor, in such a manner as to face the disk-like magnet. This kind of DC brushless motor is disclosed in, for example, U.S. Pat. No. 4,631,457 which was assigned to the same assignee as the instant application. In the motor disclosed, a Hall generator is disposed at a central part of each of particular ones of the armature coils which are held in a predetermined relationship in terms of electrical angle. A circuit pattern for the detection of rotor speed is provided to surround the armature coils and with the bearing at the center. An annular magnet having N and S poles arranged alternately on a circle is fitted on the rotor in face-to-face relation to the circuit pattern on the stator, cooperating with the circuit pattern to constitute a frequency generator. A drive circuit associated with the motor responds to the frequency generator and Hall generators by switching drive currents applied to the armature coils, whereby the motor is controlled for acceleration, deceleration and constant-speed rotation. A drawback with such a prior art DC brushless motor is that it needs a great number of circuit parts and elements and, in addition, suffers from the scattering in the performance of the Hall generators as well as from errors inherent in an assembly line. Another drawback is that the Hall generator which is located at the center of each particular armature coil limits the number of turns which may be provided on the inner side of the coil and, thereby, the output torque of the motor while rendering the assembly complicated.

To eliminate the drawbacks discussed above, the assignee of the instant application has proposed a DC brushless motor driving method which implements a control with a motor speed sensing device only and without resorting to those devices which are sensitive to the angular positions of a rotor, i.e. Hall generators (see Japanese Patent Laid-Open Publication No. 194692/1984). A DC brushless motor to which this driving method is applicable is not provided with Hall generators. A motor speed sensor plate is rigidly mounted on a rotor in place of the annular magnet. This plate is provided with a number of slits which are arranged on a circle the center of which is defined by a shaft of the rotor. A pair of speed sensors are located to face the slits of the speed sensor plate with their phases deviated by an electrical angle of 90 degrees from each other. In this arrangement, the speed sensors produce pulses the frequency of which corresponds to the rotation speed of the rotor. A control circuit adapted to drive the motor switchs drive currents applied to armature coils in response to the output pulses of the speed sensors, thereby controlling the acceleration, deceleration and constant-speed drive of the motor. At the time of starting the motor, currents fed to the armature coils are switched to excite them over several phases so as to locate the rotor at a predetermined starting position. Thereafter, output pulses of the speed sensors are counted to determine each instantaneous angular position of the rotor and, thereby, to control the rotation of the motor.

In the event of start-up, the rotor will be located at the starting position with accuracy if the currents applied to the armature coils are switched in a predetermined sequence so as to excite the coils over several phases. To reverse the rotation of the rotor, a current in the direction of a certain phase is applied to the armature coils to continue the rotation of the rotor and, when a predetermined phase is reached, a command indicative of the direction of current of the next phase and a command indicative of the opposite direction are prepared. As the torque exerted by the current flowing through the armature coils to the rotor becomes zero to stop the rotor, the current application command in the opposite direction is delivered to supply that current to the armature coils. Such a procedure allows the rotor to be located at the starting position without the need for Hall generators.

However, as will be understood from the above, the rotor torque becomes substantially zero when the rotation direction of the rotor is reversed. Hence, should any load act on an apparatus which is connected to the output shaft of the rotor to be driven thereby, the rotor might fail to be stopped at its ideal stop position. In a printer, for example, a mechanism for transporting a carriage which is loaded with a print head is connected to the output shaft of the motor. Usually, the print head is located to face a paper sheet with the intermediary of an ink ribbon, so that friction is generally developed between the print head and the ink ribbon. In this situation, it often occurs that when the rotor torque is reduced to substantially zero in the vicinity of the stop position, the rotor is prevented from being brought to a halt accurately at its starting point due to the frictional load. Stated another way, the load which is constituted by the ink ribbon is apt to prevent the rotor from being positioned at the predetermined stop point with accuracy. This positioning error invites relatively great ripples during motor drive to follow and, thereby, makes constant-speed drive difficult.

SUMMARY OF THE INVENTION

It is therefore an object of the present invention to provide a method of and an apparatus for driving a DC brushless motor which is capable of accurately positioning a rotor of the motor at a predetermined angular starting point.

In accordance with the present invention, a driving method for controlling a direct DC brushless motor by applying currents to a plurality of armature coils in a predetermined sequence to rotate a rotatable rotor, the DC brushless motor having a stator having the armature coils which are provided on a generally circular stator yoke, the rotor in which a disk-like magnet having N and S poles arranged alternately in a circumferential direction is provided on a generally circular rotor yoke to face the armature coils, and a speed sensing means for producing pulses responsive to a rotation speed of the rotor, comprises the steps of, at a start-up of the motor, switching the current applied to the armature coils to excite them in several different phases to thereby locate the rotor at a starting angular position, in the event when the rotor is located at the starting angular position, cancelling load acting on the rotor, at least before the last phase is excited, and subsequently controlling rotation drive by counting output pulses of the speed sensing means to sense an angular position of the rotor. The rotation direction of the rotor is controlled on the basis of output pulses of the sensing means and on a resulting count of those output pulses.

Also, in accordance with the present invention, a driving apparatus for controlling the drive of a DC brushless motor having a stator including a plurality of armature coils which are provided on a generally circular stator yoke, and a rotatable rotor in which a disk-like magnet having N and S poles arranged alternately in a circumferential direction is provided on a generally circular rotor yoke to face the armature coils, comprises a speed sensing means for producing pulses responsive to a rotation speed of the rotor, a counting means for counting the pulses which are produced by the speed sensing means, a control means responsive to the speed sensing means and counting means for controlling the current, which is applied to the armature coils, to apply currents to the armature coils in a predetermined sequence, and a means for cancelling a load acting on the rotor. The control means, at a start-up of the motor, switches the current applied to the armature coils to excite them in several different phases to thereby locate the rotor at a starting angular position, in the event when the rotor is located at the starting angular position, cancels a load acting on the rotor, at least before the last phase is excited, subsequently controls rotation drive by counting output pulses of the speed sensing means to sense an angular position of the rotor, and controls a rotation direction of the rotor on the basis of output pulses of the speed sensing means and on a resulting count of those output pulses.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
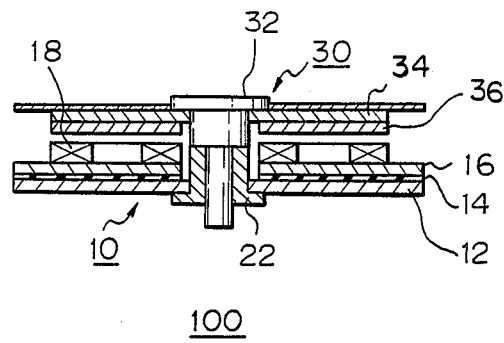
FIG. 1 is a cross-sectional side elevation showing a DC brushless motor to which a driving method in accordance with the present invention is applicable.
Figure 2:
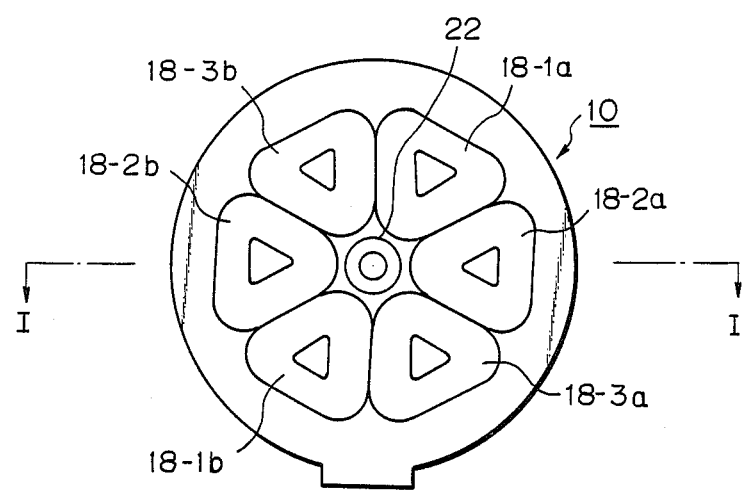
FIG. 2 is a plan view of a stator which is included in the motor of FIG. 1, the section of FIG. 1 being taken along along line I—I of FIG. 2.

Referring to FIGS. 1 to 4, a DC brushless motor 100 to which the present invention is applicable includes a stator 10 which in turn includes a generally circular stator yoke 12 made of a magnetic material. An insulating plate 14 and a substrate 16 which are also circular are laminated in this order on the stator yoke 12, and a plurality of armature coils 18 are arranged on the substrate 16. In this particular example, as shown in FIG. 2, six armature coils 18-1a, 18-2a, 18-3a, 18-1b, 18-2b and 18-3b are arranged on a circle and, as shown in FIG. 5, connected in three phases $\phi_1$, $\phi_2$ and $\phi_3$. Provided in a radially central part of the stator 10 is a bearing 22 which rotatably supports a shaft 32 of a rotor 30, which will be described.

Figure 3:
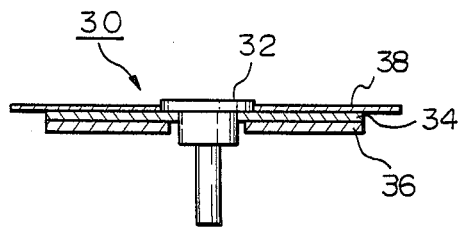
FIG. 3 is a cross-sectional side elevation of a rotor also included in the motor of FIG. 1.
Figure 4:
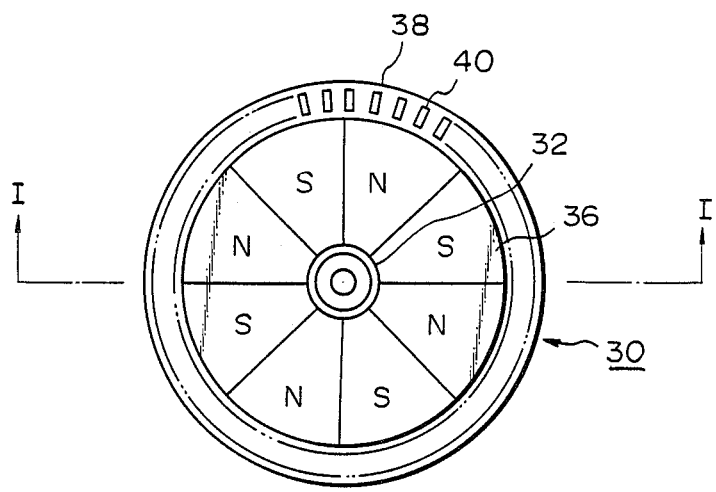
FIG. 4 is a plan view of the rotor of the motor as shown in FIG. 1, the cross-sections of FIGS. 1 and 3 being taken along line I—I of FIG. 4.
Figure 5:
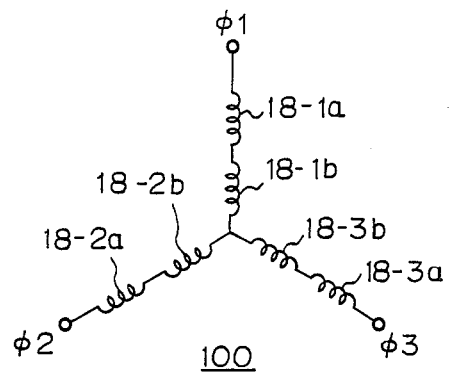
FIG. 5 is a circuit diagram showing the connection of armature coils of the DC brushless motor.
Figure 7:
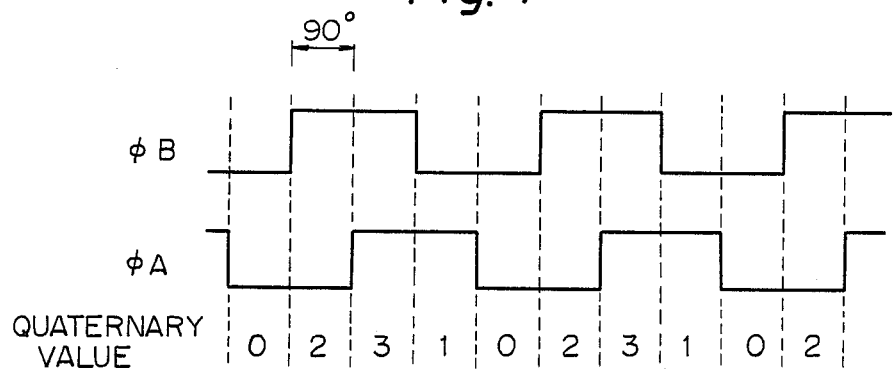
FIG. 7 is a chart showing speed signal wave-forms which are obtained from speed sensing slits of the motor.
Figure 10:
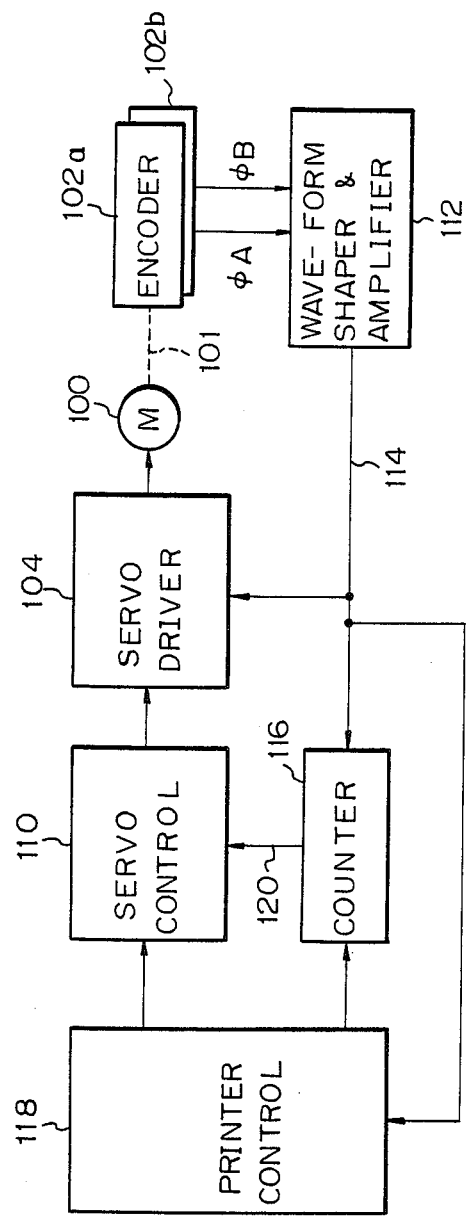
FIG. 10 is a schematic block diagram showing a preferred embodiment of the present invention which is applied to a printer.

As shown in FIGS. 3 and 4, the rotor 30 includes a generally circular rotor yoke 34 which is made of a magnetic material, and a disk-like magnet 36 which is rigid on the rotor yoke 34 and provided with N and S poles arranged alternately in, in this particular embodiment, eight equally dimensioned sectors in total. The shaft 32 of the rotor 30 is provided in the central part of the rotor yoke 34. The magnet 36 is positioned to face the armature coils 18 of the stator 10. A generally circular speed sensor plate 38 is rigidly mounted on the rotor yoke 34. A plurality of, e.g., ninety-six slits 40 are formed through a peripheral part of the speed sensor plate 38 at equally spaced locations along the circumference of the latter. The slits 40 may be implemented with optical ones or physical ones as desired. Two speed sensors, or encoders, 102a and 102b, FIG. 10, are located at positions which are offset by 90 degrees from each other in terms of electrical angle, in correspondence with the speed sensor plate 38, as schematically represented by a dotted line 101 in FIG. 10. The output wave-forms of the encoders 102a and 102b in the above arrangement are shown in FIG. 7. In FIG. 7, the numerals shown at the bottom are the digital quaternary representations of the encoder outputs which use Most Significant Bit $\phi B$ and Least Significant Bit $\phi A$.

Referring to FIG. 10, the outputs $\phi A$ and $\phi B$ of the encoders 102a and 102b, respectively, are fed to a wave-form shaper and amplifier 112 to have their waveforms shaped and amplified. The output 114 of the wave-form shaper and amplifier 112 is a train of two-bit pulses, as shown in FIG. 7. In this embodiment which is advantageously applied to a printer, the output 114 of the wave-form shaper and amplifier 112 is routed to a servo driver 104, a binary counter 116, and a printer control 118. The counter 116 comprises a binary counter for counting the input two-bit pulses $\phi A$ and $\phi B$ and, as it reachs a predetermined count, delivers a signal representative of it from its output 120 to the servo control 110. The printer control 118 serves as a controller which controls the printer function of the entire apparatus in response to various commands, which may be entered by an operator or a host machine, as well as to the output of the wave-form shaper and amplifier 112.

Figure 6:
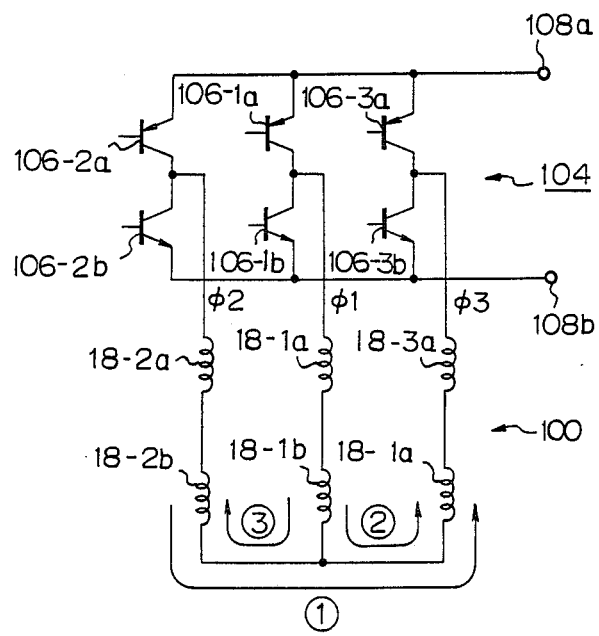
FIG. 6 is a circuit diagram including a drive circuit which drives the motor in three phases.

As shown in FIG. 6, collectors of transistors 106-1a to 106-3b are connected to the armature coils 18-1a to 18-3b. Emitters of the transistors 106-1a to 106-3a are connected to a positive drive power source terminal 108a, emitters of the transistors 106-1b to 106-3b are connected to a negative drive power source terminal 108b. Further, bases of all the transistors 106-1a to 106-3b are connected to the servo control 110, FIG. 10. Supplied with switching signals from the servo control 110, the transistors 106-1a to 106-3b switch the currents which flow through the armature coils 18.

The principle of operation of the DC brushless motor 100 will be outlined hereinafter.

When a current is caused to flow through the armature coils 18 in a direction of a certain phase, the armature coils 18 receive a current force according to the Fleming's left-hand law. However, because the armature coils 1B are fixed in place, a reaction force acts on the magnet 36 resulting that the rotor 30 is driven in a motion. Upon the rotation of the rotor 30, each of the speed sensors 102a and 102b produces pulse signals when sensed the slits 40 of the speed sensor plate, or slit plate, 38. The counter 116 counts the output pulses of the speed sensors 102a and 102b. The servo control 110 controls the DC brushless motor 100 for acceleration, deceleration, and constant-speed drive on the basis of the count of those pulses.

Figure 8:
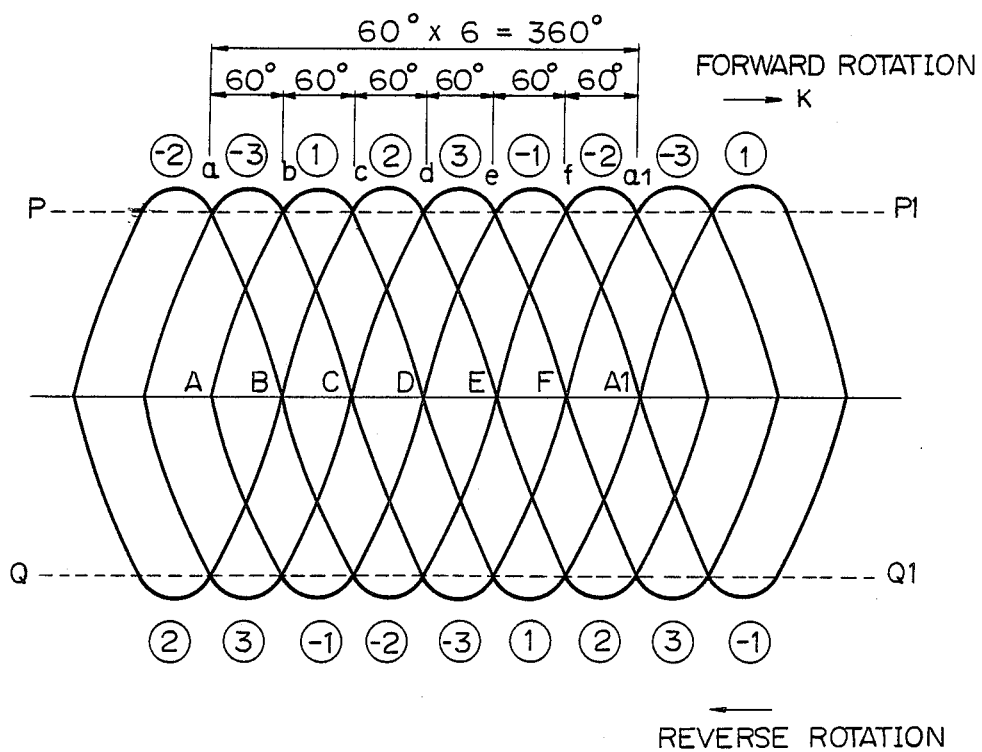
FIG. 8 is a plot showing output torques of the motor.

Assuming two-phase excitation, for example, currents are applied to the armature coils 18 in six different directions, i.e., directions [1], [2] and [3] as shown in FIG. 6 and directions [−1], [−2] and [−3], not shown, which are opposite to the directions [1], [2] and [3], respectively. It should be born in mind that while such six directions of current application are indicated by circled numerals in the figures which will follow, they will be indicated by parenthesized numerals as shown above in the following description. Wave-forms of output torques obtained when constant currents of the directions of arrows [1], [2], [3], [−1], [−2] and [−3] are applied to the armature coils 18 are shown in FIG. 8. In FIG. 8, points a, b, c, d, e, f and a1 are representative of crossing points of the respective output torque wave-forms with a dotted line P-P1, and points A, B, C, D, E, F and A1 are representative of the positions of the rotor 30 where the torques of the points a, b, c, d, e, f and a1, respectively, are generated.

The six wave-forms shown in FIG. 8 are analogues to one another and deviate from one another by 60 degrees in terms of electrical angle. When the directions of the currents are changed by each electrical angle of 60 degrees such as to the direction [−3] at the point a toward the point b, to the direction [1] at the point b toward the point c, to the direction [2] at the point c toward the point d, and so on, an output torque with the least ripple is obtained above the dotted line P—P1 and the rotor 30 is rotated forward (clockwise as seen in a direction of arrow K shown in FIG. 8). In case of the reverse rotation (counterclockwise rotation), the portion below the dotted line Q—Q1 may be used.

When the currents are changed over by every electrical angle of 60 degrees, the changeover occurs six times in one cycle (point a to point a1). Furthermore, this one cycle corresponds to the pitch of the arrangement of N and S poles of the magnet 36. It follows that, as seen from FIG. 4, one rotation of the rotor 30 corresponds to four cycles and, therefore, there occurs twenty-four times of current changeover in total which is four times greater than six times of current changeover. Assuming that ninety-six slits 40 are arranged at equal intervals in the speed sensor plate 38 as previously stated, four pulses which is one twenty-fourths of ninety-six or, in terms of binary state information, eight states which is double the four pulses appear on the outputs of the encoders 102a and 102b during the period of one application of the current, e.g. between the points a and b of FIG. 8.

At the time of starting, the positional relationship between the magnet 36 of rotor 30 and the armature coils 18 of the stator 10 is defined by any one of the points A through A1 as shown in FIG. 8. First, the current is supplied in the direction [1] (step 201, FIG. 15A), and a sufficient time is allowed to elapse for stopping the rotor 30 (202). Then, the current is supplied in the direction [2] and, again, a sufficient time is allowed to elapse (204). Such a driving procedure successfully brings the rotor 30 into a locked state at the point E (FIG. 8) by supplying the current in the direction [2], even if the rotor 30 has been balanced at a certain point such as the point A1 or even if it has been locked at, for example, the point D.

In the above construction, whatever angular position the magnet 36 may assume at the time of starting, the position of the magnet 36 is set at the point E without fail if the current is applied in the direction [1] and, then, in the direction [2]. To rotate the motor forward from such a position, the current is sequentially applied in the directions [−1], [−2], [−3], [1], [2], [3] and [−1] . . . in this order. To rotate it reverse, on the other hand, the current is sequentially applied in the directions [−3], [−2], [−1], [3], [2], [1] and [−3] . . . in this order. As regards the timing of changeover of the current, the changeover may be effected every time the speed sensors 102a and 102b sense four pulses or eight binary states in cooperation with the slit plate 38. After the start of rotation, the counter 116 counts output pulses of the speed sensors 102a and 102b, and the motor 100 is continuously rotated until the count reaches a predetermined number. This causes the rotor 30 to rotate to a target angular position.

The rotation direction of the rotor 30 is identified on the basis of the quaternary outputs of the speed sensors 102a and 102b. Assuming that the sequence of digital outputs "0", "2", "3", "1" and "0" . . . is representative of forward rotation, then the sequence of "0", "1", "3", "2" and "0" . . . is representative of reverse rotation. It follows that the current changeover timing mentioned earlier is determined in response to sixteen sensor outputs, which is four times greater than the four pulses as obtained from the slit plate 38.

A method of switching the rotation direction of the motor will be described with reference made to FIG. 8. Assuming that the motor is started to rotate in the forward direction, then there are prepared as information a current application command for forward rotation and a current application command for the opposite direction, i.e., reverse rotation. For example, if the current is applied in the direction [2] for the forward rotation, the current in the direction [−2] will be adopted for the reverse rotation. The outputs of the speed sensors 102a and 102b are counted by the counter 116. Specifically, during the forward rotation of the motor, the counter 116 is incremented and, upon reaching "16", returned to "0" and, during the reverse rotation, it is decremented and, upon reaching "0", returned to "16".

Assuming that the rotation direction is changed over at the point F of FIG. 8, the current in the direction [3] is caused to flow at the point D and, then, the outputs of the sensors 102a and 102b are detected and monitored. As the rotation of the rotor 30 reaches the point E, although a forward rotation current [1] supply command and a reverse rotation current [1] supply command are prepared, the current in the direction [3] is continuously applied. When the rotor 30 is caused into a locked state at the point F, the current [1] is applied to drive the motor according to the reverse rotation current supply command prepared. Even when the rotor 30 is rotated past the point F, if only the sensor outputs are surely detected, the command information of [−2] and that of [2] are prepared for the subsequent forward and reverse rotation directions, respectively. This prevents dislocation from occurring. When the procedure described so far is repeated, the position of the rotor 30 can be controlled without resorting to Hall elements which have heretofore been indispensable.

In the case that the above-described method is used to start the motor 100, the output torque of the motor 100 is reduced in the vicinity of the stop position of the rotor 30. Specifically, it will be seen that assuming a stop position which is defined by the point F of FIG. 8, the torque is reduced in the vicinity of the point F.

Figure 11:
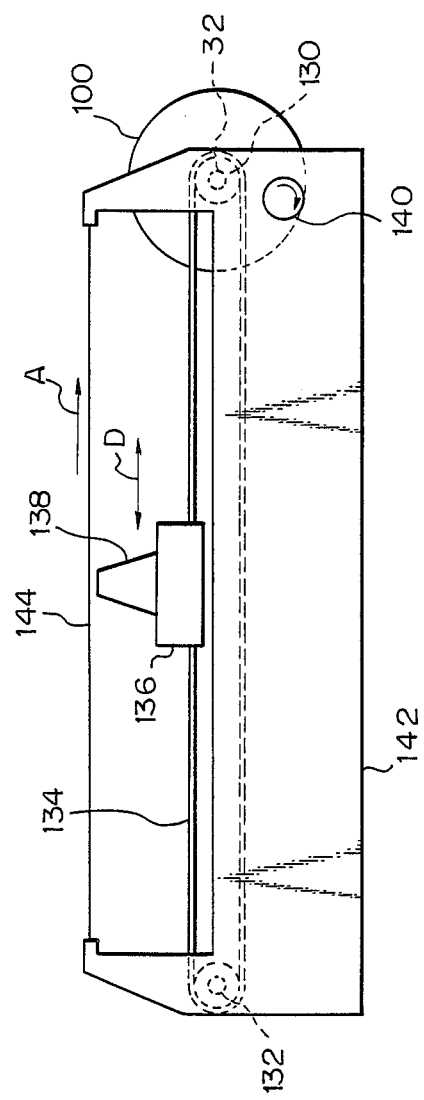
FIG. 11 is a plan view schematically showing a print head mechanism installed in the printer of FIG. 10.

Referring to FIG. 11, a printer including the DC brushless motor 100 to which the method of the present invention is advantageously applicable is shown. The motor 100 of FIG. 11 is not provided with Hall elements for position detection, as previously stated. The output shaft 32 of the motor 100 which is free to rotate is provided with a pulley 130. A drive belt 134 is passed over the pulley 130 and another pulley 132 while a carriage 136 is supported by the drive belt 134. The carriage 136 is loaded with a print head 138 and movable in both directions as indicated by a double-headed arrow D in the drawing. The output shaft 32 of the motor 100 may also be connected to a gear 140 which serves to take up an ink ribbon 144. Specifically, the gear 140 transmits a driving force for feeding the ink ribbon 144 which is encased in a cartridge 142.

To eliminate the drawbacks particular to the prior art as discussed earlier, in the event of positioning the rotor 30 at its starting point, the DC brushless motor driving method in accordance with this particular embodiment removes the load acting on the rotor 30 at least before exciting the last phase. Assuming that the ink ribbon take-up mechanism 140 is the load that acts on the rotor 30, the load may be removed by utilizing the behavior of a planetary gear mechanism 150, FIGS. 12 to 14, which is adapted to take up the ink ribbon 144 in a predetermined direction.

This method is applied to the DC brushless motor 100 which has been described. In a description to follow, the DC brushless motor 100 is assumed to be installed in the mechanism of FIG. 11. A characteristic feature of this method is that the load acting on the rotor 30 of the motor 100 is removed at least before the last phase is excited, as stated above.

Figure 12:
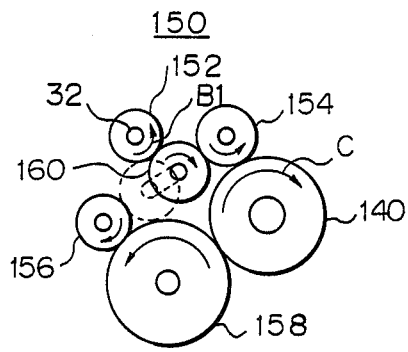
FIGS. 12, 13 and 14 are schematic views showing an ink ribbon drive mechanism of the embodiment in different operating conditions.
Figure 13:
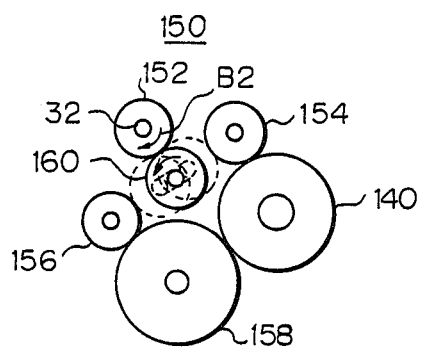
Figure 14:
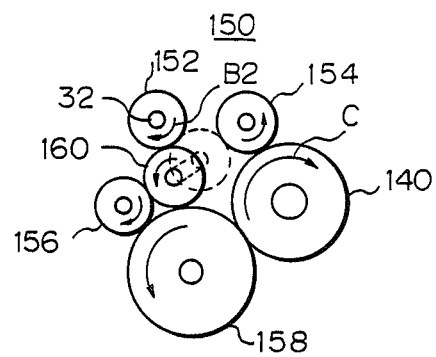

FIGS. 12, 13 and 14 show the planetary gear mechanism 150 which feeds the ink ribbon 144, FIG. 11, in a predetermined direction A by utilizing the rotation of the DC brushless motor 100. As shown, the planetary gear mechanism 150 is made up of a motor gear 152 mounted on the output shaft 32 of the motor 100, three idle gears 154, 156 and 158, a planetary gear 160, and the ribbon take-up gear 140.

In operation, as shown in FIG. 12, assuming that the motor gear 152 is rotated counterclockwise as indicated by an arrow B1, the planetary gear 160 drives the ribbon take-up gear 140 clockwise as indicated by an arrow C by way of the idle gear 154. On the other hand, as shown in FIG. 14, when the motor gear 152 is rotated clockwise as indicated by an arrow B2, the planetary gear 160 causes the ribbon take-up gear 140 to rotate clockwise as indicated by the arrow C through the idle gears 156 and 158.

The transition from the condition of FIG. 12 to that of FIG. 14 occurs by way of the condition of FIG. 13. As shown in FIG. 13, when the rotation direction of the motor gear 152 is changed over from the counterclockwise B1 to the clockwise B2, the ribbon take-up gear 140 is held in a halt while the planetary gear 160 moves from the position where it meshes with the idle gear 154 to the position where it meshes with the idle gear 156. Stated another way, during the period in which the motor 100 changes its direction of rotation causing the planetary gear 160 to move, the load acting on the motor 100 for feeding the ink ribbon 144 is maintained zero. Utilizing such an occurrence, this embodiment causes the rotor 30 to be angularly located at the starting position when the motor 100 is to start its rotation.

In the above-described method, the motor 100 is driven such that the planetary gear 160 fully meshes with either one of the idle gears 154 or 156 at the time of positioning after the printer has been powered (see FIG. 12). Subsequently, the motor 100 is driven in the opposite direction such that the planetary gear 160 does not mesh with any of the idle gears 154 and 156 (see FIG. 13). In this condition, the planetary gear 150 is brought into a free state, i.e., the load becomes zero so that the rotor 30 is positioned with accuracy.

As described above, the method of the present invention allows the rotor 30 to be accurately positioned at a prescribed stopping point because the load acting on the rotor 30 which would bring about positioning error is cancelled during the positioning period. The subsequent motor drive, therefore, is free from relatively great ripples, facilitating constant-speed drive.

Figure 9:
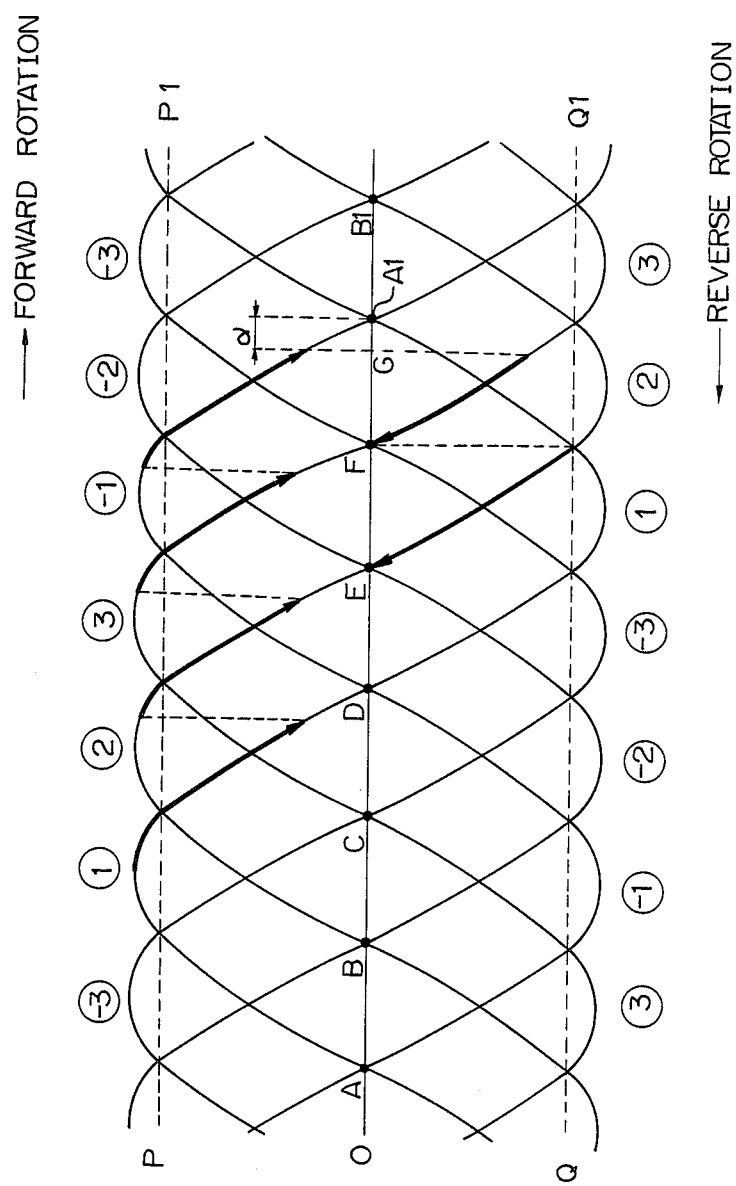
FIG. 9 is a chart similar to FIG. 8 and useful for explaining a procedure for positioning the rotor of the motor.

A reference will now be made to FIG. 9 for explaining the positioning procedure in accordance with the present invention. FIG. 9, like FIG. 8, shows output torque waveforms of the DC brushless motor 100. In the figure, the thick lines are representative of changes of torque which occur at the time of start-up of the motor 100. Assume a mechanism in which the drive of the motor 100, i.e., the changeover of the drive current is effected three consecutive times while the planetary gear 180 moves between the previously stated two positions.

Figure 15A:
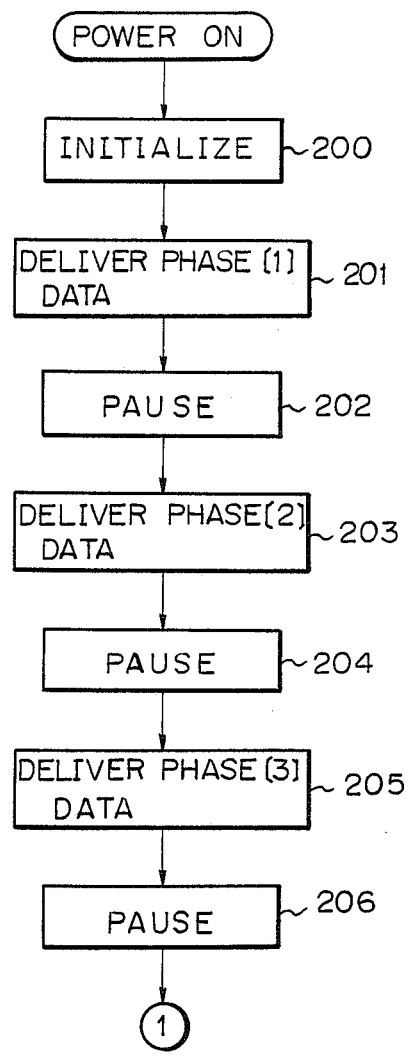
FIGS. 15A and 15B are flowcharts demonstrating an exemplary sequence of operating steps in accordance with a DC brushless motor driving method of the present invention.
Figure 15B:
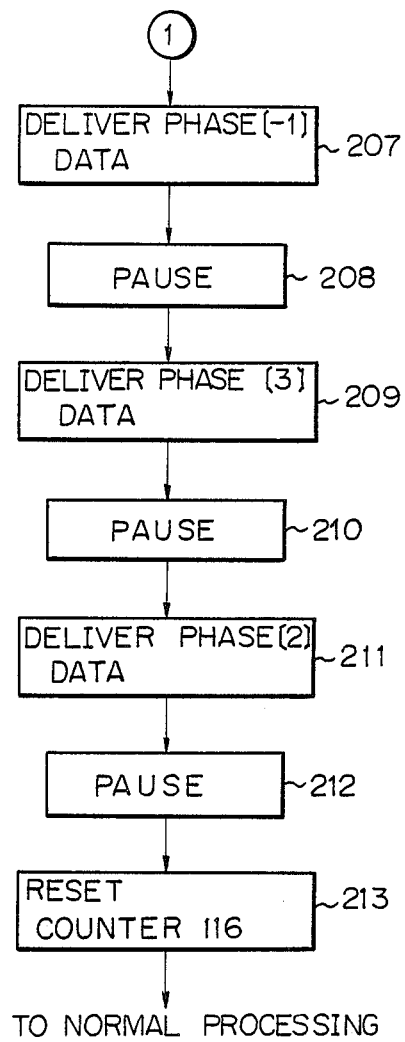

How the rotor 30 is positioned at the time of start-up of the motor 100 will be described with reference to FIGS. 15A and 15B. The drive control which will be explained is executed by the previously mentioned servo control 110. After the system has been initialized (step 200), the current is changed over three times or more in the direction of forward (clockwise) rotation, e.g., in the directions [1], [2], [3] and [−1] as indicated by the thick lines in FIG. 9, while allowing a sufficient time to elapse for stabilizing the movement of the rotor 30 (201 to 208). As a result, the planetary gear mechanism 150 is brought into the condition shown in FIG. 12 with no regard to the initial position of the planetary gear 160. Due to the load exerted by the ribbon take-up mechanism 140, the rotor 30 is stabilized at the point G by the current in the direction [−1]. At this instant, an error α has been produced between the point G and the point A1 where the rotor 30 should be stabilized optimumly. This error α, if not reduced to substantially zero, would affect constant-speed drive control to follow. In the light of this, after the rotor 30 has been temporarily stabilized at the point G, the current is changed over less than three times, e.g., from the direction [3] to the direction [2] while allowing a sufficient time to elapse for stabilizing the movement of the rotor 30 (209 to 212). Consequently, the planetary gear mechanism 150 is conditioned as shown in FIG. 13 and, hence, the load exerted by the mechanism 150 on the rotor 30 becomes zero to allow the rotor 30 to reach the optimum position E. This successfully reduces the error α to substantially zero. Thereafter, the counter 116 is reset to perform drive control as in the previously stated method. It is to be noted that the drive control described above with reference to FIGS. 15A to 15B is only illustrative and may be replaced with a one which applies the current in another phase first, e.g., phase [2].

In summary, it will be seen that the present invention eliminates the drawbacks inherent in the prior art methods which rely on Hall generators in detecting angular positions of a rotor. Moreover, because the present invention frees a rotor of a DC brushless motor from a load in the event when the rotor is located at a starting position, it prevents constant-speed drive from being affected by torque ripples due to the load. These in combination cut down the cost as well as the number of assembling steps required, realizing an inexpensive DC brushless motor. Another advantage attainable with the present invention is that the output torque is sufficiently great and, yet, the constant-speed drive is stable.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A driving method for controlling a brushless DC motor by applying currents to a plurality of armature coils in a predetermined sequence to rotate a rotatable rotor, said brushless motor having:
  a stator having the armature coils which are provided on a generally circular stator yoke;
  said rotor in which a disk-like magnet having N and S poles arranged alternately in a circumferential direction is provided on a generally circular rotor yoke to face the armature coils; and
  a speed sensing means for producing pulses responsive to a rotation speed of said rotor;
  said method comprising the steps of:
  at a start-up of said brushless motor, switching the current applied to the armature coils to excite said armature coils in several different phases, thereby locating said rotor at a starting angular position;
  in the event when said rotor is located at the starting angular position, cancelling a load acting on said rotor, at least before a last one of the phases is excited; and
  subsequently, controlling a rotational drive by counting output pulses of said speed sensing means to sense an angular position of said rotor;
  a rotation direction of said rotor being controlled on the basis of output pulses of said speed sensing means and on a resulting count of the output pulses.

2. A driving method in accordance with claim 1, wherein said speed sensing means comprises:
  a generally circular slit plate provided with a plurality of slits in a peripheral portion of said slit plate; and
  a pair of speed sensors deviating by an electrical angle of 90 degrees from each other and located to face the slits of said slit plate for obtaining from the slits the output pulses, a frequency of which corresponds to a rotation speed of said rotor.

3. A driving method in accordance with claim 1, wherein said rotor of said brushless motor is linked to an ink ribbon feeding mechanism of a printer which feeds an ink ribbon in a predetermined direction, said ink ribbon feeding mechanism including:
  a take-up means for taking up the ink ribbon;
  an idle gear means held in constant mesh with said take-up means and
  a planetary gear constantly meshed with said rotor and engageable with said idle gear means;
  in said step of cancelling the load, said planetary gear being released from the idle gear means in the event that rotation of said rotor is reversed.

4. A driving method in accordance with claim 3, wherein said rotor of said brushless motor is also linked to a carriage mechanism which is loaded with a print head of the printer, said carriage mechanism selectively transporting said print head in opposite directions;
  said idle gear means comprising a first and a second idle gear which are individually meshed with said take-up means; and
  a third idle gear meshed with said second idle gear;
  said planetary gear being selectively engageable with said first and third idle gears;
  in said step of cancelling the load, said planetary gear being caused to be in a free state between said first and third idle gears.

5. A driving apparatus for controlling drive of a brushless DC motor having;
  a stator including a plurality of armature coils which are provided on a generally circular stator yoke; and
  a rotatable rotor in which a disk-like magnet having N and S poles arranged alternately in a circumferential direction is provided on a generally circular rotor yoke to face the armature coils;
  said apparatus comprising:
  a speed sensing means for producing pulses responsive to a rotation speed of said rotor;
  a counting means for counting the pulses which are produced by said speed sensing means;
  a control means responsive to said speed sensing means and said counting means for controlling the current applied to the armature coils in a predetermined sequence; and
  a means for cancelling a load acting on said rotor;
  said control means, at a start-up of said brushless motor, switching the current applied to the armature coils to excite the armature coils in several different phases, thereby locating said rotor at a starting angular position, in the event when said rotor is located at the starting angular position, cancelling a load acting on said rotor, at least before a last one of the phases is excited, subsequently controlling a rotational drive by counting output pulses of said speed sensing means to determine an angular position of said rotor, and controlling a rotation direction of the rotor on the basis of the output pulses of said speed sensing means and on a resulting count of the output pulses.

6. A driving apparatus in accordance with claim 5, wherein said speed sensing means comprises:
  a generally circular slit plate provided with a plurality of slits in a peripheral portion of said slit plate; and
  a pair of speed sensors deviating by an electrical angle of 90 degrees from each other and located to face the slits of said slit plate for obtaining from said slits the output pulses, a frequency of which corresponds to a rotation speed of said rotor.

7. A driving apparatus in accordance with claim 6, wherein the rotor of said brushless motor is linked to an ink ribbon feeding mechanism of a printer which feeds an ink ribbon in a predetermined direction, said ink ribbon feeding mechanism including a take-up means for taking up the ink ribbon;
  said means for cancelling the load comprising:
  an idle gear means held in constant mesh with said take-up means and
  a planetary gear constantly meshed with said rotor and engageable with said idle gear means;
  said planetary gear being released from said idle gear means in the event that rotation of said rotor is reversed.

8. A driving apparatus in accordance with claim 7, wherein said rotor of said brushless motor is also linked to a carriage mechanism which is loaded with a print head of the printer, said carriage mechanism selectively transporting said print head in opposite directions;
  said idle gear means comprising a first and a second idle gear which are individually meshed with said take-up means; and
  a third idle gear meshed with said second idle gear;
  said planetary gear being selectively engageable with said first and third idle gears;
  said planetary gear being caused into a free state between the first and third idle gears.

* * * * *